(12) United States Patent
Uemura et al.

(10) Patent No.: US 9,054,554 B2
(45) Date of Patent: Jun. 9, 2015

(54) POWER SOURCE SYSTEM CONTROLLING A PLURALITY OF GENERATORS

(75) Inventors: Fumito Uemura, Chiyoda-ku (JP); Nobuhiro Kihara, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 616 days.

(21) Appl. No.: 13/358,184

(22) Filed: Jan. 25, 2012

(65) Prior Publication Data

US 2013/0057057 A1  Mar. 7, 2013

(30) Foreign Application Priority Data

Sep. 6, 2011 (JP) ................................ 2011-193671

(51) Int. Cl.
| | |
|---|---|
| *H02J 1/04* | (2006.01) |
| *H02J 1/10* | (2006.01) |
| *B60L 15/32* | (2006.01) |
| *H02P 5/74* | (2006.01) |
| *B63H 23/24* | (2006.01) |

(52) U.S. Cl.
CPC ................. *H02J 1/102* (2013.01); *B63H 23/24* (2013.01); *H02J 2001/106* (2013.01); *B60L 15/32* (2013.01); *H02P 5/74* (2013.01); *B60L 2200/32* (2013.01); *Y02T 10/642* (2013.01)

(58) Field of Classification Search
None
See application file for complete search history.

(56) References Cited

U.S. PATENT DOCUMENTS

| 1,390,624 | A | * | 9/1921 | Lamme ............................ 318/45 |
| 4,780,659 | A | | 10/1988 | Bansal et al. | |
| 7,667,347 | B2 | * | 2/2010 | Donnelly et al. ............. 307/10.1 |
| 8,330,291 | B2 | * | 12/2012 | Kumar ............................ 307/9.1 |
| 2010/0033130 | A1 | * | 2/2010 | Mizushima et al. ........... 320/126 |
| 2010/0049386 | A1 | | 2/2010 | Bamba | |
| 2010/0094490 | A1 | * | 4/2010 | Alston et al. ..................... 701/21 |
| 2010/0289459 | A1 | * | 11/2010 | Kihara et al. ...................... 322/7 |
| 2011/0204878 | A1 | | 8/2011 | Thorngreen et al. | |

FOREIGN PATENT DOCUMENTS

| DE | 102005028513 A1 | 12/2006 |
| JP | 2000-201439 A | 7/2000 |
| JP | 4100793 A | 6/2008 |
| JP | 2010-288436 A | 12/2010 |

OTHER PUBLICATIONS

Communication dated Dec. 3, 2014, issued by the German Patent and Trademark Office in corresponding German Application No. 10 2012 200 974.4.

* cited by examiner

*Primary Examiner* — Rexford Barnie
*Assistant Examiner* — David Shiao
(74) *Attorney, Agent, or Firm* — Sughrue Mion, PLLC; Richard C. Turner

(57) ABSTRACT

In the case where the rotation speeds of respective magneto alternating current (AC) generators of a plurality of power source apparatuses (10, 20, and 30) are approximately the same rotation speed and the total electric power generation demand is the same as or smaller than the maximum total generated electric power of the plurality of power source apparatuses (10, 20, and 30), the integrated control unit (6) for integrally controlling the plurality of power source apparatuses (10, 20, and 30) selects at least one of the plurality of the power source apparatuses (10, 20, and 30) and controls a voltage control unit (5) of the selected power source apparatus in such a way that the selected power source apparatus generates maximum generated electric power thereof, at the rotation speed, that is the same as or smaller than the total electric power generation demand.

6 Claims, 5 Drawing Sheets

__US 9,054,554 B2__

POWER SOURCE SYSTEM CONTROLLING A PLURALITY OF GENERATORS

BACKGROUND OF THE INVENTION

1. Field of the Invention

The present invention relates to a power source system configured with a plurality of power source apparatuses, in each of which a magneto generator is utilized.

2. Description of the Related Art

Power source apparatuses utilizing a magneto generator include, for example, a power source apparatus disclosed in Patent Document 1. The power source apparatus disclosed in Patent Document 1 is configured as a battery charger mounted in a vehicle and is provided with a magneto alternating current (AC) generator, a rectification circuit, and a power-generation voltage control circuit. The power source apparatus disclosed in Patent Document 1 is configured in such a way that AC electric power generated by the magneto alternating current (AC) generator is converted into DC electric power by the rectification circuit and is inputted to the power-generation voltage control circuit; in the power-generation voltage control circuit, voltage control is applied to the DC electric power in such a way that a voltage corresponding to the battery voltage is produced; then, the voltage is supplied to the battery.

In the power source apparatus disclosed in Patent Document 1, the output voltage to be supplied to the battery is stopped for a given time or the output voltage is changed so that the load on the power generator is reduced when the engine is accelerated; thus, the acceleration performance of the engine can be raised.

Patent Document 2 discloses a power source apparatus provided with a magneto alternating current (AC) generator, a rectification circuit, a DC voltage transformer, and a voltage control unit. The power source apparatus disclosed in Patent Document 2 is configured in such a way that AC electric power generated by the magneto alternating current (AC) generator is converted into DC electric power by the rectification circuit and is inputted to the DC voltage transformer; based on an operation status signal related to the magneto alternating current (AC) generator and a load status signal, the transformation ratio of the DC voltage transformer is controlled by the voltage control unit; then, the DC electric power is supplied to loads such as the battery and the like.

The power source apparatus disclosed in Patent Document 2 makes it possible to largely raise the power generation efficiency by controlling the transformation ratio of the DC voltage transformer.

PRIOR ART REFERENCE

Patent Document

[Patent Document 1] Japanese Patent No. 4100793
[Patent Document 2] Japanese Patent Application Laid-Open No. 2010-288436

The power source apparatus disclosed in Patent Document 1 is formed of only a single magneto alternating current (AC) generator. However, for example, in the case where an internal combustion engine is operated with a plurality of magneto alternating current (AC) generators mounted on a single and the same crankshaft or in the case where a vessel is operated with two or more outboard engines, each of which is equipped with a magneto alternating current (AC) generator, mounted thereon, the conventional power source apparatus disclosed in Patent Document 1 controls the output voltages of all the magneto alternating current (AC) generators to become equal to one another so that the output voltage coincides to the voltage of the electric load; however, there has been a problem that all the magneto alternating current (AC) generators are not necessarily operated at a high power generation efficiency.

In contrast, even in the case where a vessel is operated with two or more outboard engines, each of which is equipped with a magneto alternating current (AC) generator, mounted thereon, as well as, in the case where a plurality of magneto alternating current (AC) generators is mounted on a single and the same crankshaft, the power source apparatus disclosed in Patent Document 2 controls the respective rotation speeds of the outboard engines to become almost equal to one another; therefore, each of the magneto alternating current (AC) generators can be operated at approximately the same high power generation efficiency. However, there has been a problem that in the case where the required electric power is smaller than the maximum total power generation capacity of a plurality of magneto alternating current (AC) generators, operating all of the plurality of magneto alternating current (AC) generators at approximately the same power generation efficiency does not necessarily mean that a plurality of internal combustion engines, as a whole, can be operated at minimum energy loss.

SUMMARY OF THE INVENTION

The present invention has been implemented in order to solve the foregoing problems in conventional power source apparatuses; the objective thereof is to provide a power source system that operates a plurality of power source apparatuses each utilizing a magneto alternating current (AC) generator at small energy consumption so that the electric power corresponding to the total electric power generation demand can be generated.

A power source system according to the present invention, which is provided with a plurality of power source apparatuses and an integrated control unit that can integrally control the plurality of power source apparatuses in accordance with a total electric power generation demand, is characterized in that each of the power source apparatuses is provided with a magneto alternating current (AC) generator provided with a rotor having magnetic poles for producing magnetic field flux and an armature winding that generates an AC current based on rotation of the rotor; a rectification unit that rectifies an AC current generated by the magneto alternating current (AC) generator into a DC current; a DC voltage transformer that receives electric power based on a DC output voltage of the rectification unit and transforms the DC output voltage of the rectification unit into an inter-input-terminal voltage of an electric load; and a voltage control unit that controls the transformation ratio of the DC voltage transformer, based on at least an operation status signal indicating the operation status of the magneto alternating current (AC) generator, and in that in the case where the rotation speeds of the respective magneto alternating current (AC) generators of the plurality of power source apparatuses are approximately the same rotation speed and the total electric power generation demand is the same as or smaller than the maximum total generated electric power of the plurality of power source apparatuses, the integrated control unit selects at least one of the plurality of the power source apparatuses and controls the voltage control unit of the selected power source apparatus in such a way that the selected power source apparatus generates maximum generated electric power thereof, at the rotation speed, that is the same as or smaller than the total electric power generation demand.

The power source system according to the present invention is configured in such a way that in the case where the rotation speeds of the respective magneto alternating current (AC) generators of the plurality of power source apparatuses are approximately the same rotation speed and the total electric power generation demand is the same as or smaller than the maximum total generated electric power of the plurality of power source apparatuses, the integrated control unit selects at least one of the plurality of the power source apparatuses and controls the voltage control unit of the selected power source apparatus in such a way that the selected power source apparatus generates maximum generated electric power thereof, at the rotation speed, that is the same as or smaller than the total electric power generation demand; therefore, the plurality of power source apparatuses are operated at as small consumption energy as possible so that the electric power corresponding to the total electric power generation demand can be generated.

The foregoing and other object, features, aspects, and advantages of the present invention will become more apparent from the following detailed description of the present invention when taken in conjunction with the accompanying drawings.

DETAILED DESCRIPTION OF THE PREFERRRED EMBODIMENTS

Embodiment 1

Figure 1:
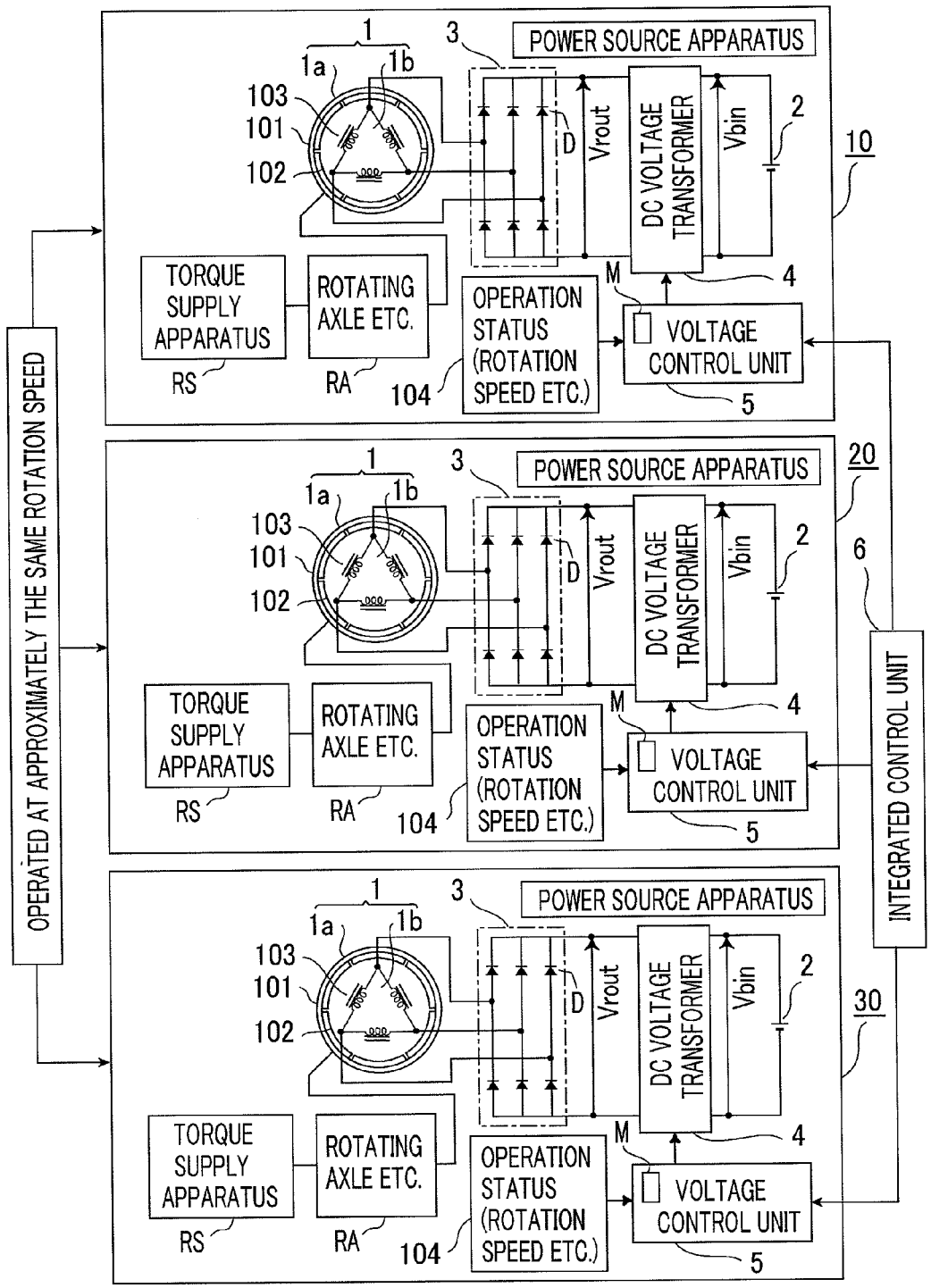
FIG. 1 is a configuration diagram representing a power source system according to Embodiment 1 of the present invention.

FIG. 1 is a block diagram representing a power source system according to Embodiment 1 of the present invention; there is represented a power source system configured with three power source apparatuses each of which is provided with a magneto alternating current (AC) generator. In FIG. 1, the power source system is provided with a power source apparatus 10 as a first power source apparatus, a power source apparatus 20 as a second power source apparatus, and a power source apparatus 30 as a third power source apparatus.

The first power source apparatus 10, the second power source apparatus 20, and the third power source apparatus 30 are configured in a single and the same manner; each of the power source apparatuses 10, 20, and 30 is configured in such a way as to be provided with a magneto alternating current (AC) generator as a magneto generator, a rectification unit 3, a DC voltage transformer 4, a voltage control unit 5 including a memory M, and a rotation speed sensor 104 as an operation status detection device, described later, and supplies DC electric power to an electric storage device 2 as a load. The electric storage device 2 is, for example, a battery.

In each of the power source apparatuses 10, 20, and 30, the rectification unit 3 applies full-wave rectification to an AC current generated by the magneto alternating current (AC) generator 1 so as to obtain a DC current and inputs the DC current to the DC voltage transformer 4. The DC voltage transformer 4 transforms the inter-output-terminal voltage of the rectification unit 3 into the inter-input-terminal voltage of the electric storage device 2 and supplies the input terminal voltage to the electric storage device 2. As described later, the voltage control unit 5 variably controls the transformation ratio of the inter-input-terminal voltage of the electric storage device 2 to the inter-output-terminal voltage of the rectification unit 3 in the DC voltage transformer 4.

In the power source system according to Embodiment 1, the power source apparatuses 10, 20, and 30 are configured in such a way as to be operated concurrently with one another by a torque supply apparatus RS, at approximately the same rotation speed, and there is provided an integrated control unit 6 for integrally control the power source apparatuses 10, 20, and 30.

In each of the power source apparatuses 10, 20, and 30, a rotor 1a of the magneto alternating current (AC) generator 1 is provided with a cylindrically formed supporting member 101 and a rotor magnet 102 that is fixed on the inner circumferential surface of the supporting member 101, along the circumferential direction thereof.

A stator 1b disposed in the space of the rotor 1a is provided with a Δ-connection three-phase armature winding 103. The outer circumferential surface of the stator 1b and the inner circumferential surface of the rotor magnet 102 face each other in such a way as to be spaced apart from each other by a predetermined gap. In addition, a Y-connection armature winding may be adopted as the three-phase armature winding 103.

The rotor 1a is coupled with a rotation axle RA to which torque is transmitted from the torque supply apparatus RS. The rotation axle RA is rotation-driven by the torque supply apparatus RS. In the case where the power source apparatus 10 is, for example, a power source apparatus for an internal combustion engine, the torque supply apparatus RS is the internal combustion engine, and the rotation axle RA is the crankshaft of the internal combustion engine or is formed of a rotation axle coupled with the crankshaft or coupled with the crankshaft by the intermediary of a belt or a gear.

When the rotation axle RA is driven to rotate by the torque supply apparatus RS, the rotor 1a of the magneto alternating current (AC) generator 1 rotates along with the rotation axle RA, thereby generating an AC current in the armature winding 103 of the stator 1b. The AC current generated in the armature winding 103 of the stator 1b is rectified into a DC current by the rectification unit 3 formed of a three-phase diode bridge configured with six diodes.

The DC voltage transformer 4 transforms the inter-output-terminal voltage Vrout of the rectification unit 3 into the inter-input-terminal voltage Vbin of the electric storage device 2 and supplies the input terminal voltage to the electric storage device 2. The transformation ratio (Vbin/Vrout) in this situation is a value that varies depending on the operation status of the magneto alternating current (AC) generator 1 or the torque supply apparatus RS, and is controlled by the voltage control unit 5, based on a signal indicating the operation status of the magneto alternating current (AC) generator 1 or the torque supply apparatus RS.

Figure 2:
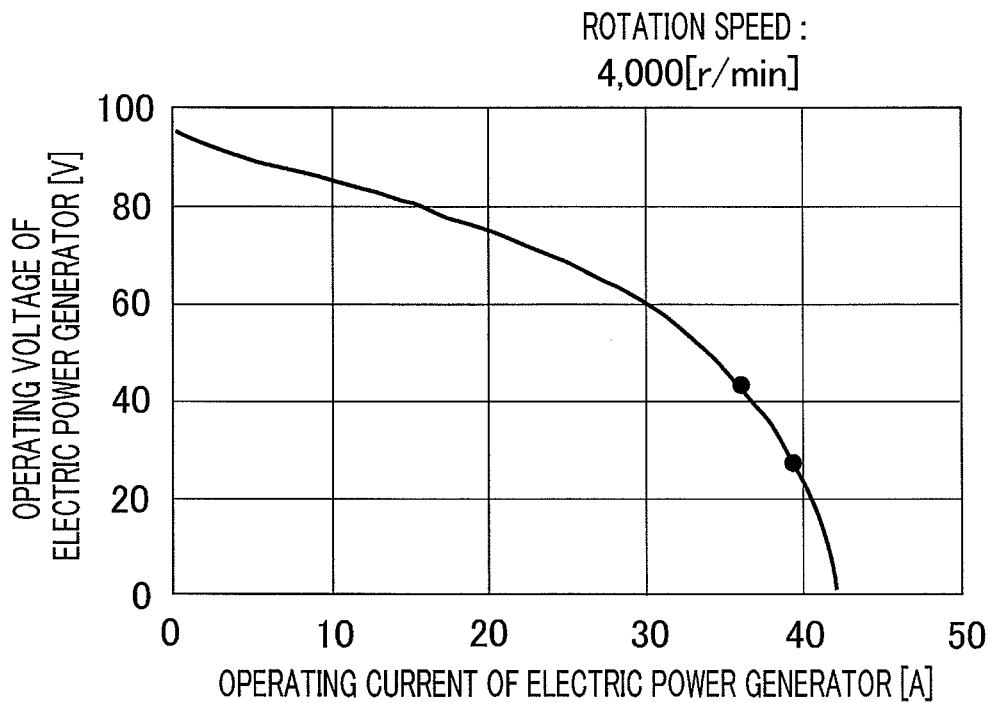
FIG. 2 is a characteristic graph representing the operating voltage vs. power-generation current characteristic of a magneto alternating current (AC) generator utilized in a power source system according to Embodiment 1 of the present invention.

Specifically, the DC voltage transformer 4 is formed, for example, of a step-down non-insulated DC/DC electric-power conversion circuit illustrated in FIG. 2 of Patent Document 2, described above. The step-down non-insulated DC/DC electric-power conversion circuit is configured with an input terminal capacitor Ci; a series circuit that is connected in parallel with the input terminal capacitor Ci and in which a MOSFET (field-effect transistor) and a current feedback diode D0 are connected in series with each other; and a series circuit that is connected in parallel with the current feedback diode D0 and in which an inductor Lc and an output terminal capacitor Co are connected in series with each other.

In the step-down non-insulated DC/DC electric-power conversion circuit, the inter-output-terminal voltage Vrout of the rectification unit 3 is applied across the input terminal capacitor Ci, and the transformed voltage Vbin is outputted across the output terminal capacitor Co. The transformed voltage Vbin is a voltage supplied to the electric storage device 2.

In this situation, the MOSFET is ON/OFF-controlled by the voltage control unit 5, based on a signal indicating the operation status of the magneto alternating current (AC) generator 1 or the torque supply apparatus RS, whereby the inter-output-terminal voltage Vrout of the rectification unit 3 is transformed in such a way as to become the inter-input-terminal voltage Vbin of the electric storage device 2.

Figure 6:
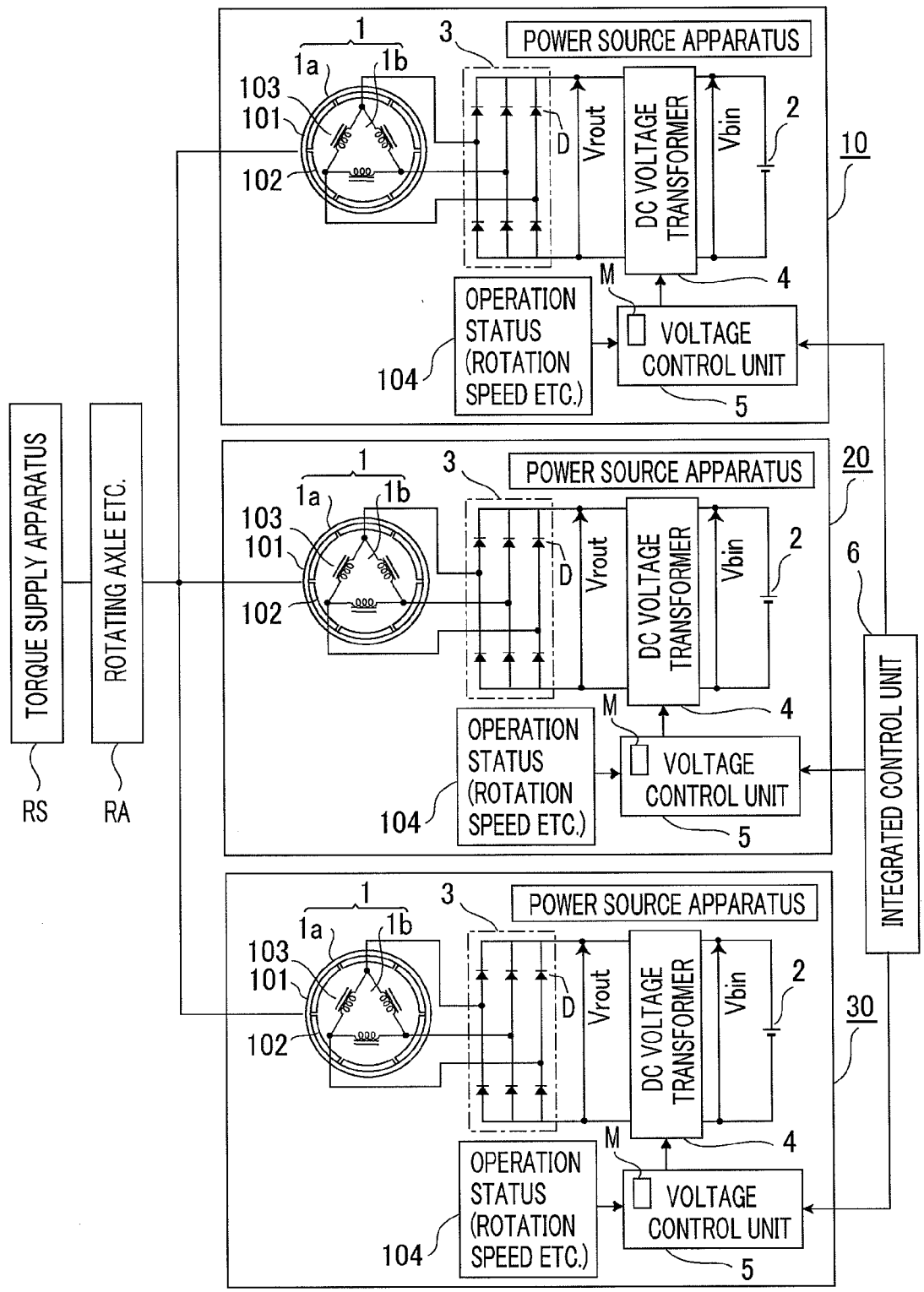
FIG. 6 is a configuration diagram representing a power source system according to Embodiment 3 of the present invention.

In addition, the DC voltage transformer 4 may be, for example, a voltage-variable DC/DC electric-power conversion circuit illustrated in FIGS. 6, 8, and 15 of Patent Document 2, described above; however, the detailed explanation therefor will be omitted.

As the signal indicating the operation status of the magneto alternating current (AC) generator 1 or the torque supply apparatus RS, the output signal of the rotation speed sensor 104 that detects the rotation speed of the rotor 1a is utilized. In the case where the power source apparatus 10 is mounted in an internal combustion engine, as the signal indicating the operation status, there can be utilized, for example, the output signal of a rotation speed sensor that detects the rotation speed of the internal combustion engine crankshaft with which the rotor 1a is connected or a rotation speed signal that can be obtained from an internal combustion engine electronic control system or the like.

In the case where three power source apparatuses 10, 20, and 30 represented in FIG. 1 are concurrently utilized, the integrated control unit 6 controls at least one out of the three power source apparatuses at a transformation ratio different from those of the residual two power source apparatuses, based on the total electric power generated by the three power source apparatuses 10, 20, and 30. In some cases, all the power source apparatuses are controlled at respective different transformation ratios. Describing further in detail, while keeping the power source apparatuses 10, 20, and 30 operated at respective different operation statuses, the integrated control unit 6 sets the respective transformation ratios of the power source apparatuses by controlling the respective voltage control units 5 so that the total energy of the three internal combustion engines, required for the electric power generation by the three power source apparatuses 10, 20, and 30 is smaller than the total energy in the case all the three power source apparatuses 10, 20, and 30 are operated at approximately the same operation status.

The control of the power source apparatuses 10, 20, and 30 by the integrated control unit 6 will be specifically explained below. FIG. 2 is a characteristic graph representing the operating voltage vs. power-generation current characteristic of a magneto alternating current (AC) generator utilized in a power source system according to Embodiment 1 of the present invention; the ordinate denotes the operating voltage [V] of a magneto alternating current (AC) generator, and the abscissa denotes the operating current[A] of the magneto alternating current (AC) generator; the operating voltage vs. power-generation current characteristic, at the rotation speed of 4000 [r/min], of the magneto alternating current (AC) generator is represented by a solid curve.

In FIG. 2, the magneto alternating current (AC) generator utilized in the power source apparatus of the power source system according to Embodiment 1 of the present invention is characterized in that as represented by the solid characteristic curve, electric power of 1000 [W] is generated when the generation voltage is 28[V] and electric power of 1500 [W] is generated when the generation voltage is 42[V]. The following explanation will be made under the assumption that in the power source system according to Embodiment 1, the actual maximum generation capacity of each of the power source apparatuses 10, 20, and 30 is 1500 [W] when the rotation speed is 4000 [r/min]. The characteristic curve in FIG. 2 was obtained based on actual measurement.

Figure 3:
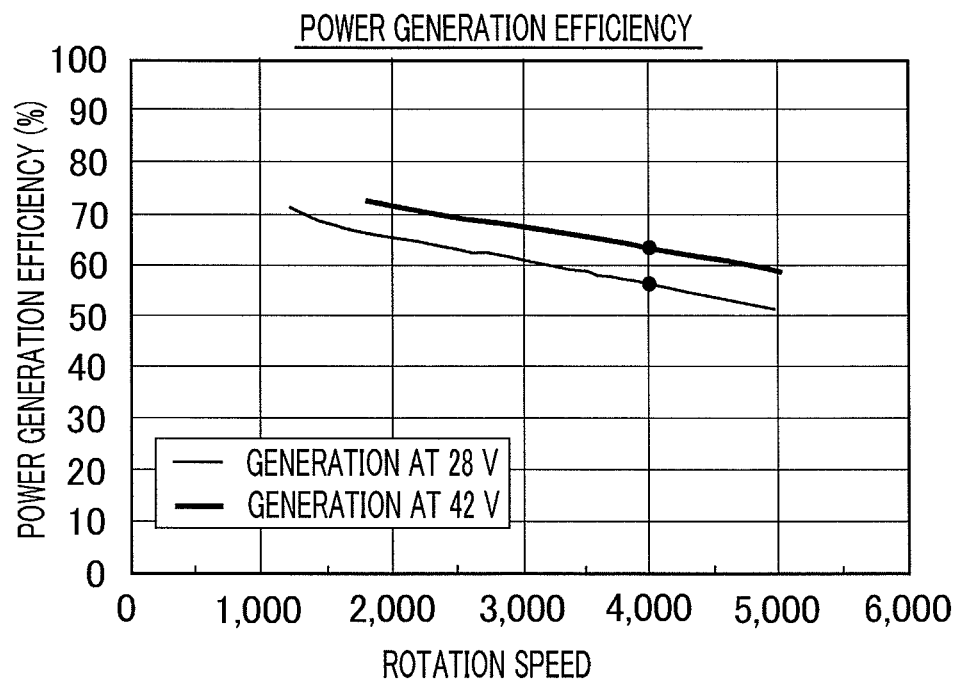
FIG. 3 is a characteristic graph representing the power generation efficiency vs. rotation speed characteristic of a magneto alternating current (AC) generator utilized in a power source system according to Embodiment 1 of the present invention.

FIG. 3 is a characteristic graph representing the power generation efficiency vs. rotation speed characteristic of a magneto alternating current (AC) generator utilized in a power source system according to Embodiment 1 of the present invention; the ordinate denotes the power generation efficiency [%], and the abscissa denotes the rotation speed [r/min]; the power generation efficiency characteristic at a time when the generation voltage is 28[V] is represented by a thin solid curve, and the power generation efficiency characteristic at a time when the generation voltage is 42[V] is represented by a thick solid curve.

In FIG. 3, the magneto alternating current (AC) generator utilized in the power source apparatus of the power source system according to Embodiment 1 of the present invention is characterized in that as represented by the thin solid line, the power generation efficiency is 56.4[%] when the generation voltage is 28[V] and, as represented by the thick solid line, the power generation efficiency is 63.5[%] when the generation voltage is 42[V]. These characteristic curves were obtained based on actual measurement.

In this situation, for example, in the conventional power source system disclosed in Patent Document 2, three power source apparatuses are concurrently operated at a rotation speed of 4000 [r/min]; when electric power of 3000 [W] is required, all the three power source apparatuses are controlled in such a way as to have the best power generation efficiency for the generated electric power of 1000 [W], as the target. In other words, all the three power source apparatuses are made to generate electric power with the generation voltage of 28[V], and the power generation efficiency obtained at this time is 56.4[%]. At this time, the required energy of the internal combustion engine, as a torque supply apparatus, is given below.

$$(1000[W] \times 3)/0.564 = 5319[W]$$

In contrast, the power source system according to Embodiment 1 of the present invention generates electric power in such a way that, for example, when electric power of 3000 [W] is required, two out of the three power source apparatuses that are operated at a rotation speed of 4000 [r/min] are controlled by the voltage control unit 5 to have the best power generation efficiency for the generated electric power of 1500 [W] per power source apparatus, as the target. That is to say, only two of the three power source apparatuses are made to generate electric power with the generation voltage of 42[V], and the power generation efficiency that can be obtained is 63.5[%]. At this time, the required energy of the internal combustion engine, as a torque supply apparatus, is given below.

(1500[W]×2)/0.635=4,724[W]

The residual one of the power source apparatuses is controlled in such a way that the output terminal thereof is opened or closed, or in such a way as to generate with a low generation voltage, so that the consumption energy thereof is minimized. In this case, the consumption energy of the residual one power source apparatus is approximately 300 [W] when the rotation speed thereof is 4000 [r/min].

Accordingly, compared to the foregoing conventional apparatus, the power source system according to Embodiment 1 of the present invention can reduce the energy by approximately 300 [W], as expressed by the following calculation formula, when the rotation speed is, for example, 4000 [r/min].

5319 [W]−(4724[W]+300[W])=295[W]

Figure 4:
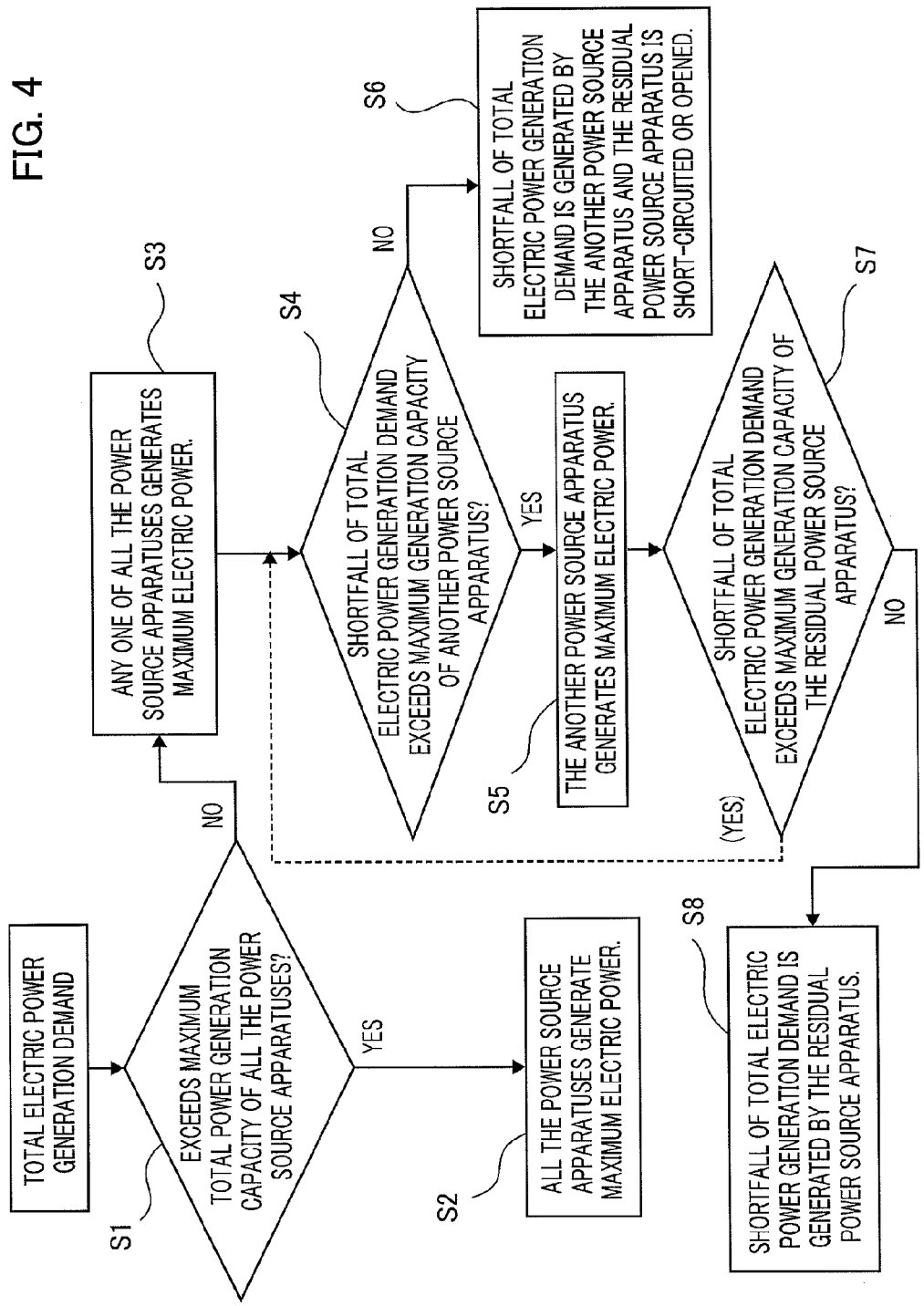
FIG. 4 is a flowchart representing a control flow of a power source system according to Embodiment 1 of the present invention.

Next, the operation of the power source system according to Embodiment 1 of the present invention will be explained with reference to a flowchart. FIG. 4 is a flowchart representing a control flow of a power source system according to Embodiment 1 of the present invention. The following explanation will be made under the assumption that as represented in FIG. 1, the power source system is configured with three power source apparatuses, i.e., the first to third power source apparatuses.

In FIG. 4, at first, in the step S1, the integrated control unit 6 determines whether or not the total electric power generation demand exceeds the maximum total power generation capacity of all the power source apparatuses. For example, when the rotation speed of the magneto alternating current (AC) generator 1 of each of the power source apparatuses 10, 20, and is 4000 [r/min], the actual maximum generation capacity of each of the power source apparatuses 10, 20, and 30 is 1500 [W]; thus, if the total electric power generation demand is 5000 [W], which exceeds 4500 [W], the result of the determination in the step S1 is "YES" and the step S1 is followed by the step S2.

In the step S2, the integrated control unit 6 controls the respective voltage control units of the power source apparatuses in such a way that all the power source apparatuses generate the maximum electric power, and then ends the processing. For example, as described above, the integrated control unit 6 controls the respective voltage control units 5 of the power source apparatuses 10, 20, and 30 in such a way that when the rotation speed is 4000 [r/min], each of the power source apparatuses 10, 20, and 30 generates the maximum electric power of 1500 [W]. Accordingly, the DC voltage transformer 4 of each of the power source apparatuses 10, 20, and 30 transforms the inter-output-terminal voltage Vrout of the rectification unit 3 to 42[V] and supplies the 42[V] to the electric storage device 2.

In contrast, in the case where it is determined in the step S1 that the total electric power generation demand does not exceed the maximum total power generation capacity of all the power source apparatuses (No), the step S1 is followed by the step S3. In the step S3, the integrated control unit 6 controls any one of the power source apparatuses in such a way that this particular power source apparatus generates the maximum electric power, and then the step S3 is followed by the step S4. For example, if the total electric power generation demand is 3000 [W], the result of the determination in the step S1 is "NO" and the step S1 is followed by the step S3.

In the step S3, as one of all the power source apparatuses, for example, the first power source apparatus 10 is selected, and the integrated control unit 6 controls the voltage control unit 5 of the first power source apparatus 10 in such a way that when the rotation speed is 4000 [r/min], the first power source apparatus 10 generates the maximum electric power of 1500 [W]. Accordingly, the DC voltage transformer 4 of the first power source apparatus 10 transforms the inter-output-terminal voltage Vrout of the rectification unit 3 to 42[V] and supplies the 42[V] to the electric storage device 2. In this situation, the power generation efficiency of the first power source apparatus 10 is, for example, 63.5[%].

Next, the step S3 is followed by the step S4, where the integrated control unit 6 determines whether or not a shortfall of the total electric power generation demand exceeds the maximum generation capacity of any one of the other power source apparatuses. For example, if the total electric power generation demand is 3000 [W], the shortfall of the total electric power generation demand is 1500 [W] due to the implementation of the step S3; thus, the result of the determination in the step S4 is "NO" and the step S4 is followed by the step S6.

When the step S4 is followed by the step S6, the integrated control unit 6 controls the respective voltage control units of the power source apparatuses in such a way that the any one of the other power source apparatuses generates the maximum electric power and the residual power source apparatuses are short-circuited or opened, and then ends the processing. For example, the integrated control unit 6 selects the second power source apparatus 20, as the any one of the other power source apparatuses, and controls the voltage control unit 5 of the second power source apparatus 20 in such a way that when the rotation speed is 4000 [r/min], the second power source apparatus 20 generates the maximum electric power of 1500 [W].

Accordingly, the DC voltage transformer 4 of the second power source apparatus 20 transforms the inter-output-terminal voltage Vrout of the rectification unit 3 to 42[V] and supplies the 42[V] to the electric storage device 2. In contrast, the third power source apparatus 30, which is the residual power source apparatus, is controlled by the integrated control unit 6 to be short-circuited or opened and the consumption energy thereof is minimized. In this case, as described above, the consumption energy of the third power source apparatus 30 is approximately 300 [W] when the rotation speed is 4000 [r/min]; thus, by implementing the step S6, the power source system according to Embodiment 1 of the present invention can reduce the energy by approximately 300 [W], compared to the foregoing conventional apparatus.

In contrast, in the case where it is determined in the step S4 that the shortfall of the total electric power generation demand exceeds the maximum generation capacity of the any one of the other power source apparatuses, e.g., the second power source apparatus 20 (NO), the step S4 is followed by the step S5. For example, if the total electric power generation demand is 4000 [W], the shortfall of the total electric power generation demand is 2500 [W] due to the implementation of the step S3; thus, the result of the determination in the step S4 is "YES" and the step S4 is followed by the step S5.

In the step S5, the integrated control unit 6 controls the voltage control unit 5 of the second power source apparatus 20, which is the any one of the other power source apparatuses, in such a way that the second power source apparatus 20 generates the maximum electric power. For example, if the total electric power generation demand is 4000 [W], the shortfall of the total electric power generation demand is 2500 [W] due to the implementation of the step S3; however, in the step S5, the second power source apparatus 20 generates the maximum electric power of 1500 [W]. The DC voltage transformer 4 of the second power source apparatus 20 transforms the inter-output-terminal voltage Vrout of the rectification unit 3 to 42[V] and supplies the 42[V] to the electric storage device 2. In this situation, the power generation efficiency of the second power source apparatus 20 is, for example, 63.5 [%].

Next, the step S5 is followed by the step S7, where the integrated control unit 6 determines whether or not the shortfall of the total electric power generation demand exceeds the maximum generation capacity of the residual power source apparatus. For example, if the total electric power generation demand is 4000 [W], the shortfall of the total electric power generation demand is 1000 [W] due to the implementation of the step S5; thus, the result of the determination in the step S7 is "NO" and the step S7 is followed by the step S8.

In the step S8, the integrated control unit 6 controls the voltage control unit 5 of the third power source apparatus 30, which is the residual power source apparatus, in such a way that the third power source apparatus 30 generates the shortfall electric power of 1000 [W]. That is to say, the third power source apparatus 30 is controlled by the voltage control unit 5 so as to generate electric power of 28[V]; the power generation efficiency thereof is, for example, 56.4[%]

The foregoing explanation with reference to FIG. 4 has been made under the assumption that the power source system is configured with three power source apparatuses; however, in the case where there exist more than three power source apparatuses, as the flow represented by a broken line in FIG. 4, the step S7 is followed by the step S4, depending on the value of the total electric power generation demand; in the step S4, it is determined again whether or not the shortfall of the total electric power generation demand exceeds the maximum electric power generated by the any one of the residual power source apparatuses; based on the result of the determination, the step S4 may be followed by the step S6 or the step S5. Generally speaking, the step S4 is repeated until the value of the shortfall of the total electric power generation demand becomes not to exceed the maximum generation capacity of the residual power source apparatus, i.e., until the result of the determination becomes "NO".

With regard to the operation of the foregoing power source system according to Embodiment 1 of the present invention, any one of the maximum power point tracking control and the power-generation control map for each rotation speed may be utilized for controlling the power source apparatuses. In this embodiment, the power-generation control map denotes a map in which for the purpose that each of the power source apparatuses generates the maximum electric power at the each rotation speed, the generation voltage for each rotation speed is preliminarily determined and is stored in the memory M of the voltage control unit 5. The maximum power point tracking control denotes control in which the maximum electric power is maintained even when the rotation speed changes, by, during power generation by each power source apparatus, changing the generation voltage in such a way that the product of a current and a voltage, i.e., the electric power becomes maximal.

The foregoing power source system according to Embodiment 1 of the present invention operates a plurality of internal combustion engines, as torque supply apparatuses, at as small consumption energy as possible so that the electric power corresponding to the total electric power generation demand can be generated by a plurality of power source apparatuses.

The foregoing power source system according to Embodiment 1 of the present invention is obtained by converting the invention, described in one of the items (1) through (4) below, into a tangible form.

(1) A power source system provided with a plurality of power source apparatuses and an integrated control unit that can integrally control the plurality of power source apparatuses in accordance with a total electric power generation demand, the power source system being characterized in that each of the power source apparatuses is provided with a magneto alternating current (AC) generator provided with a rotor having magnetic poles for producing magnetic field flux and an armature winding that generates an AC current based on rotation of the rotor; a rectification unit that rectifies an AC current generated by the magneto alternating current (AC) generator into a DC current; a DC voltage transformer that receives electric power based on a DC output voltage of the rectification unit and transforms the DC output voltage of the rectification unit into an inter-input-terminal voltage of an electric load; and a voltage control unit that controls the transformation ratio of the DC voltage transformer, based on at least an operation status signal indicating the operation status of the magneto alternating current (AC) generator, and in that in the case where the rotation speeds of the respective magneto alternating current (AC) generators of the plurality of power source apparatuses are approximately the same rotation speed and the total electric power generation demand is the same as or smaller than the maximum total generated electric power of the plurality of power source apparatuses, the integrated control unit selects at least one of the plurality of the power source apparatuses and controls the voltage control unit of the selected power source apparatus in such a way that the selected power source apparatus generates maximum generated electric power thereof, at the rotation speed, that is the same as or smaller than the total electric power generation demand.

(2) A power source system characterized in that in the case where even though the selected power source apparatus generates the maximum generated electric power thereof, the total electric power generation demand is not satisfied, and a shortfall of the total electric power generation demand exceeds the maximum generated electric power, at the rotation speed, of another power source apparatus other than the selected power source apparatus, the integrated control unit further selects said another power source apparatus other than the selected power source apparatus and controls the voltage control unit of said further selected another power source apparatus in such a way that said further selected another power source apparatus generates maximum generated electric power thereof at the rotation speed.

(3) A power source system characterized in that in the case where even though said further selected another power source apparatus generates the maximum generated electric power thereof, the total electric power generation demand is not satisfied, and a shortfall of the total electric power generation demand is the same as or smaller than maximum generated electric power, at the rotation speed, of the residual power source apparatus out of the plurality of power source apparatuses, the integrated control unit controls the voltage control unit of the residual power source apparatus in such a way that the residual power source apparatus generates electric power, at the rotation speed, that corresponds to the shortfall of the total electric power generation demand.

(4) A power source system characterized in that in the case where even though the selected power source apparatus generates the maximum generated electric power thereof, the total electric power generation demand is not satisfied, and a shortfall of the total electric power generation demand is the same as or smaller than the maximum generated electric power, at the rotation speed, of another power source apparatus other than the selected power source apparatus, the integrated control unit further selects said another power source apparatus, controls the voltage control unit of said further selected another power source apparatus in such a way that said further selected another power source apparatus generates electric power, at the rotation speed, that corresponds to the shortfall of the total electric power generation demand, and short-circuits or opens the residual power source apparatus out of the plurality of power source apparatuses.

Embodiment 2

Figure 5:
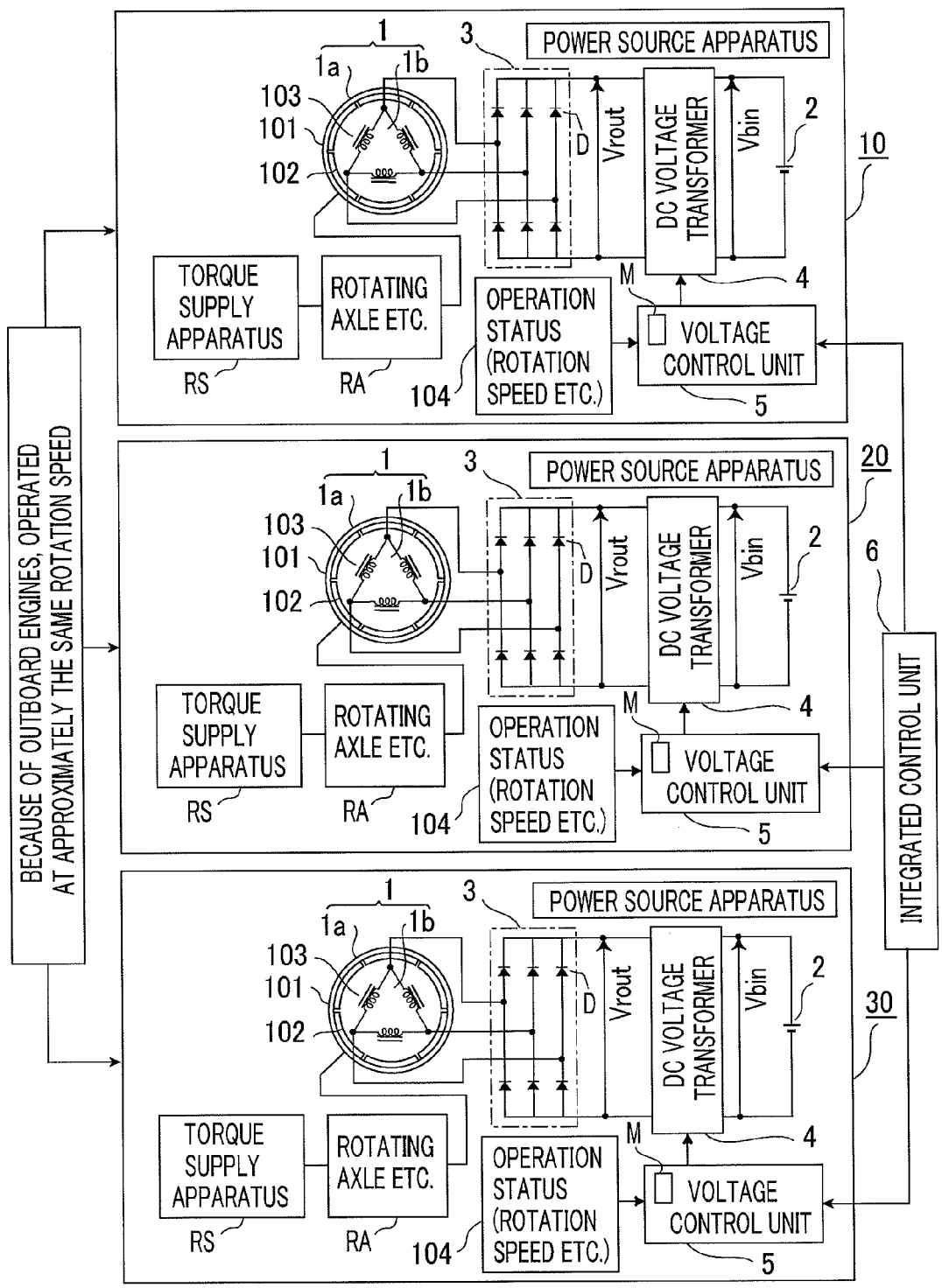
FIG. 5 is a configuration diagram representing a power source system according to Embodiment 2 of the present invention.

FIG. 5 is a configuration diagram representing a power source system according to Embodiment 2 of the present invention; there is represented a case where two or more outboard engines are mounted in a vessel body, operated at approximately the same rotation speed, and are concurrently utilized as propulsion force. In each of the outboard engines, there is mounted at least one of the power source apparatuses; thus, in some cases, the vessel body is equipped with power source apparatuses in the number the same as or larger than the number of the outboard engines. All the power source apparatuses are utilized at approximately the same rotation speed. FIG. 5 represents a case where a vessel body is provided with three outboard engines and each outboard engine has a single power source apparatus.

Because respective outboard engines thereof are mounted in a single vessel body, the power source apparatuses 10, 20, and 30 are operated at approximately the same rotation speed. The configurations of the power source apparatuses 10, 20, and 30 are the same as those in Embodiment 1, described above; therefore, detailed explanation therefor will be omitted. The constituent elements the same as or similar to those in Embodiment 1 are designated by reference characters the same as those in Embodiment 1.

As is the case with Embodiment 1, three power source apparatuses 10, 20, and 30 are concurrently operated in the power source system according to Embodiment 2; thus, the respective rotation speeds of the torque supply apparatuses RS, i.e., the rotation speeds of the magneto alternating current (AC) generators 1 are approximately the same. In accordance with the total electric power generation demand, the power source apparatuses 10, 20, and 30 can be controlled by the integrated control unit 6, with respective different transformation ratios based on the total generated electric power of the power source apparatuses 10, 20, and 30. While controlling the power source apparatuses with respective different transformation ratios, the integrated control unit 6 controls the power source apparatuses in such a way that the energy of the driving power source required for electric power generation by all the power source apparatuses can be reduced compared to the energy at a time when all the power source apparatuses are operated in approximately the same manner. Specifically, the process is similar to the foregoing flowchart in FIG. 4; therefore, detailed explanation therefor will be omitted.

As a power source system, utilized in a vessel body, that is configured with a plurality of outboard engines, the power source system according to Embodiment 2 of the present invention operates a plurality of internal combustion engines, as torque supply apparatuses, at as small consumption energy as possible so that the electric power corresponding to the total electric power generation demand can be generated by a plurality of power source apparatuses.

The foregoing power source system according to Embodiment 2 of the present invention is obtained by converting the invention, described in the item (5) below, in addition to any one of the inventions described in the items (1) through (4) above, into a tangible form.

(5) A power source system characterized in that the plurality of power source apparatuses are respective power source apparatuses provided in a plurality of outboard engines mounted in a vessel body.

Embodiment 3

FIG. 6 is a configuration diagram representing a power source system according to Embodiment 3 of the present invention; there is represented a case where a plurality of power source apparatuses is mounted on the crankshaft of a single internal combustion engine. In this case, in accordance with the total electric power generation demand, all the power source apparatuses can be controlled by the integrated control unit 6, with respective different transformation ratios based on the total generated electric power of the power source apparatuses. While controlling the power source apparatuses with respective different transformation ratios, the integrated control unit 6 controls the power source apparatuses in such a way that the energy of the driving power source required for electric power generation by all the power source apparatuses can be reduced compared to the energy at a time when all the power source apparatuses are operated in approximately the same manner. Specifically, the process is similar to the foregoing flowchart in FIG. 4; therefore, detailed explanation therefor will be omitted.

The foregoing power source system according to Embodiment 3 of the present invention operates a single internal combustion engine, as a torque supply apparatus that supplies torque to the respective magneto alternating current (AC) generators of a plurality of power source apparatuses, at as small consumption energy as possible so that the electric power corresponding to the total electric power generation demand can be generated by the plurality of power source apparatuses.

The foregoing power source system according to Embodiment 3 of the present invention is obtained by converting the invention, described in the item (6) below, in addition to any one of the inventions described in the items (1) through (4) above, into a tangible form.

(6) A power source system characterized in that the rotor of each of the magneto alternating current (AC) generators of a plurality of power source apparatuses is driven by a single and the same torque supply apparatus.

Various modifications and alterations of this invention will be apparent to those skilled in the art without departing from the scope and spirit of this invention, and it should be understood that this is not limited to the illustrative embodiments set forth herein.

What is claimed is:

1. A power source system provided with a plurality of power source apparatuses and an integrated control unit that can integrally control the plurality of power source apparatuses in accordance with a total electric power generation demand:

wherein each of the power source apparatuses is provided with a magneto alternating current (AC) generator provided with a rotor having magnetic poles for producing magnetic field flux and an armature winding that generates an AC current based on rotation of the rotor; a rectification unit that rectifies an AC current generated by the magneto alternating current (AC) generator into a DC current; a DC voltage transformer that receives electric power based on a DC output voltage of the rectification unit and transforms the DC output voltage of the rectification unit into an inter-input-terminal voltage of an electric load; and a voltage control unit that controls the transformation ratio of the DC voltage transformer, based on at least an operation status signal indicating the operation status of the magneto alternating current (AC) generator, wherein in the case where the rotation speeds of the respective magneto alternating current (AC) generators of the plurality of power source apparatuses are approximately the same rotation speed and the total electric power generation demand is smaller than the maximum total generated electric power of the plurality of power source apparatuses, the integrated control unit selects at least one of the plurality of the power source apparatuses and controls the voltage control unit of the at least one selected power source apparatus in such a way that the at least one selected power source apparatus generates maximum generated electric power thereof, at the rotation speed, that is the same as or smaller than the total electric power generation demand, and wherein at least another of said power source apparatuses is operated at a transformation ratio different from that of said at least one power source apparatus, to meet the power generation demand.

2. The power source system according to claim 1, wherein in the case where even though the at least one selected power source apparatus generates the maximum generated electric power thereof, the total electric power generation demand is not satisfied, and a shortfall of the total electric power generation demand exceeds the maximum generated electric power, at the rotation speed, of another power source apparatus other than the at least one selected power source apparatus, the integrated control unit further selects said other power source apparatus other than the at least one selected power source apparatus and controls the voltage control unit of said further selected another power source apparatus in such a way that said further selected another power source apparatus generates maximum generated electric power thereof at the rotation speed.

3. The power source system according to claim 2, wherein in the case where even though said further selected another power source apparatus generates the maximum generated electric power thereof, the total electric power generation demand is not satisfied, and a shortfall of the total electric power generation demand is the same as or smaller than maximum generated electric power, at the rotation speed, of one or more residual power source apparatuses out of the plurality of power source apparatuses, the integrated control unit controls the voltage control unit of one of the residual power source apparatuses in such a way that the one residual power source apparatus generates electric power, at the rotation speed, that corresponds to the shortfall of the total electric power generation demand and is less than the maximum electric power generatable by said one residual power source.

4. The power source system according to claim 1, wherein in the case where even though the at least one selected power source apparatus generates the maximum generated electric power thereof, the total electric power generation demand is not satisfied, and a shortfall of the total electric power generation demand is the same as or smaller than the maximum generated electric power, at the rotation speed, of another power source apparatus other than the at least one selected power source apparatus, the integrated control unit further selects said other power source apparatus, controls the voltage control unit of said further selected other power source apparatus in such a way that said further selected other power source apparatus generates electric power, at the rotation speed, that corresponds to the shortfall of the total electric power generation demand, and short-circuits or opens any residual power source apparatuses out of the plurality of power source apparatuses.

5. The power source system according to claim 1, wherein, the plurality of power source apparatuses are respective power source apparatuses provided in a plurality of outboard engines mounted in a vessel body.

6. The power source system according to claim 1, wherein, the rotor of each of the respective magneto alternating current (AC) generators of the plurality of power source apparatuses is driven by a single and the same torque supply apparatus.

* * * * *